(12) United States Patent
Lee et al.

(10) Patent No.: US 12,337,567 B2
(45) Date of Patent: Jun. 24, 2025

(54) PRESSING APPARATUS INCLUDING FLUID AND ELECTRODE AND ELECTRODE ASSEMBLY MANUFACTURING METHOD USING THE SAME

(71) Applicant: LG Energy Solution, Ltd., Seoul (KR)

(72) Inventors: Byeong Kyu Lee, Daejeon (KR); Soon Kwan Kwon, Daejeon (KR); Ju Hyeon Cho, Daejeon (KR); Su Taek Jung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 69 days.

(21) Appl. No.: 17/914,102

(22) PCT Filed: Feb. 16, 2021

(86) PCT No.: PCT/KR2021/001974
§ 371 (c)(1),
(2) Date: Sep. 23, 2022

(87) PCT Pub. No.: WO2021/246615
PCT Pub. Date: Dec. 9, 2021

(65) Prior Publication Data
US 2023/0398758 A1 Dec. 14, 2023

(30) Foreign Application Priority Data

Jun. 3, 2020 (KR) .................. 10-2020-0066918

(51) Int. Cl.
*B30B 5/02* (2006.01)
*H01M 4/04* (2006.01)

(52) U.S. Cl.
CPC ............. *B30B 5/02* (2013.01); *H01M 4/0433* (2013.01)

(58) Field of Classification Search
CPC ... B30B 5/02; B30B 9/22; B30B 11/001; B30B 9/28; H01M 4/0433; H01M 4/8896; B32B 37/10; B32B 37/1054; B29C 66/81451; B29C 66/81453; B29C 66/81461
See application file for complete search history.

(56) References Cited

U.S. PATENT DOCUMENTS 4,030,961 A * 6/1977 Straeten ............ B32B 17/10862
100/211
6,105,648 A 8/2000 De Graaf et al.
(Continued)

FOREIGN PATENT DOCUMENTS

CN 103534819 A 1/2014
JP 3057259 U 4/1999
(Continued)

OTHER PUBLICATIONS

International Search Report for PCT/KR2021/001974 mailed May 18, 2021. 3 pgs.
(Continued)

*Primary Examiner* — George R Koch
(74) *Attorney, Agent, or Firm* — Lerner David LLP (57) ABSTRACT

The present invention relates to a pressing apparatus capable of uniformly pressing an object to be pressed using a pressure adjustment portion having a fluid contained therein irrespective of the shape of the object and a pressing method using the same.

10 Claims, 3 Drawing Sheets

(56) References Cited

U.S. PATENT DOCUMENTS

| | | | |
|---|---|---|---|
| 2010/0024667 A1* | 2/2010 | Ikura | H01L 24/75 100/305 |
| 2011/0042369 A1 | 2/2011 | Ishiguro et al. | |
| 2012/0247355 A1 | 10/2012 | Berniard et al. | |
| 2014/0017845 A1 | 1/2014 | Juen et al. | |
| 2021/0114071 A1 | 4/2021 | Nakajima | |

FOREIGN PATENT DOCUMENTS

| | | |
|---|---|---|
| JP | 2000073288 A | 3/2000 |
| JP | 2001501548 A | 2/2001 |
| JP | 2004-113049 A | 4/2004 |
| JP | 2004114079 A | 4/2004 |
| JP | 2006-123236 A | 5/2006 |
| JP | 2007067273 A | 3/2007 |
| JP | 2009176584 A | 8/2009 |
| JP | 2009-262229 A | 11/2009 |
| JP | 2010198933 A | 9/2010 |
| JP | 5330817 B2 * | 10/2013 |
| JP | 2016117251 A | 6/2016 |
| JP | 2020-077466 A | 5/2020 |
| KR | 100533766 B1 | 12/2005 |
| KR | 20120112606 A | 10/2012 |
| KR | 20140027135 A | 3/2014 |
| KR | 20150026413 A | 3/2015 |
| KR | 20170099213 A | 8/2017 |
| KR | 101916919 B1 | 1/2019 |
| WO | 2012-135333 A1 | 10/2012 |
| WO | 2019-187994 A1 | 10/2019 |

OTHER PUBLICATIONS

Extended European Search Report for Application No. 21818335.8 dated Sep. 12, 2023. 9 pgs.

* cited by examiner

PRESSING APPARATUS INCLUDING FLUID AND ELECTRODE AND ELECTRODE ASSEMBLY MANUFACTURING METHOD USING THE SAME

CROSS-REFERENCE TO RELATED APPLICATIONS

This application is a national stage entry under 35 U.S.C. § 371 of International Application No. PCT/KR2021/001974, filed on Feb. 16, 2021, which claims priority to Korean Patent Application No. 10-2020-0066918, filed on Jun. 3, 2020, the disclosures of which are hereby incorporated herein by reference in their entireties.

TECHNICAL FIELD

The present invention relates to a pressing apparatus including a fluid and a pressing method using the same, and more particularly to a pressing apparatus including a pressure adjustment portion having a fluid contained therein, whereby pressure applied to target object to be pressed is changed depending on the shape of the target object, and a pressing method using the same.

BACKGROUND ART

With recent development of alternative energies due to air pollution and energy depletion caused as the result of use of fossil fuels, demand for secondary batteries capable of storing electrical energy that is produced has increased. The secondary batteries, which are being capable of being charged and discharged, are intimately used in daily life. For example, the secondary batteries are used in mobile devices, electric vehicles, and hybrid electric vehicles.

Secondary batteries used as energy sources of various kinds of electronic devices inevitably used in modern society have been used in a state of being mounted in various kinds of devices, such as mobile devices and electric vehicles. Various shapes of battery cells are required in response to user demand and variety in shape of devices in which secondary batteries are mounted.

Various shapes of battery cells may be generally formed by receiving, in a curved or bent case, an electrode having a shape corresponding to the shape of the case or an electrode assembly constituted by stacking electrodes. In order to form various shapes of electrodes, an electrode active material is applied to one surface or opposite surfaces of an electrode current collector formed so as to have a uniform shape, and is then pressed. In addition, for various shapes of electrode assemblies, various shapes of electrodes and separators are stacked, and a lamination process is performed in order to increase the force of coupling therebetween.

Figure 1:
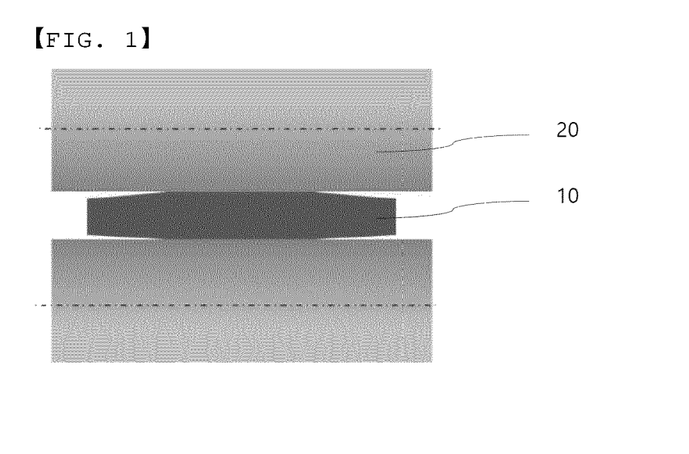
FIG. 1 is a schematic view of a conventional pressing apparatus.

FIG. 1 is a schematic view of a conventional pressing apparatus.

In order to press a target object 10 to be pressed, a pressing portion of the conventional pressing apparatus 20, which is a portion configured to come into contact with the target object 10, is flat. However, the pressing apparatus 20 having the flat pressing portion cannot apply uniform force to a target object 10 having various heights or shapes.

That is, stronger force is applied to a portion of the target object 10 that protrudes farther than the other portions of the target object, and weaker force is applied to a portion of the target object 10 that is depressed farther than the other portions of the target object, whereby the target object 10 is not uniformly laminated. In order to solve the above problem, an additional pressing process may be performed with respect to the portion of the target object 10 that is not properly laminated. In this case, however, process time is lengthened and related cost is increased as a result of performing such an additional process.

In Patent Document 1, a pattern is formed on the surface of a roll member such that compression force that is transmitted to an electrode and a separator is applied only to some regions thereof. However, there is a problem in that only a portion of a target object is compressed, whereby the entirety of the target object is not uniformly pressed at once.

In order to solve the above problem, it is necessary to consider a method capable of uniformly pressing a target object while reducing process time.

PRIOR ART DOCUMENT (Patent Document 1) Korean Patent Application Publication No. 2017-0099213 (2017.08.31)

DISCLOSURE

Technical Problem

The present invention has been made in view of the above problems, and it is an object of the present invention to provide a pressing apparatus capable of applying uniform pressing force to a target object to be pressed.

It is another object of the present invention to easily produce various shapes of electrodes or electrode assemblies using the pressing apparatus. It is a further object of the present invention to simplify an electrode and electrode assembly manufacturing process and to reduce a defect rate, whereby it is possible to reduce production cost.

Technical Solution

In order to accomplish the above objects, a pressing apparatus according to the present invention may include a contact portion having a shape or position changed depending on the shape of a target object to be pressed, a pressing portion configured to apply uniform force to the contact portion, and a pressure adjustment portion located between the contact portion and the pressing portion, the pressure adjustment portion having a fluid contained therein.

In addition, the contact portion may have a pattern configured to change pressure applied to the target object depending on the shape of the target object.

The pattern may be an oblique pattern, an X-shaped pattern, or a dot type pattern having a plurality of microscale protrusions.

The contact portion may be constituted by a plurality of protrusions configured to be individually movable.

The pressure adjustment portion may be individually connected to the contact portion.

In addition, the pressing portion may be individually or integrally connected to the pressure adjustment portion.

The pressure adjustment portion may be constituted by a fluid connected to the plurality of protrusions.

In addition, the pressure adjustment portion may contain a fluid therein so as to account for a percentage of less than 90%.

In addition, the pressing apparatus may include an upper roll including the contact portion, the pressing portion, and the pressure adjustment portion and a lower roll having the same identical construction as the upper roll.

The present invention provides an electrode and electrode assembly manufacturing method including (S1) preparing an electrode or an electrode assembly as a target object to be pressed, (S2) disposing the target object in the pressing apparatus, and (S3) pressing the target object using the pressing apparatus.

In step (S3), the pressing apparatus may be deformed or pressing force applied to the contact portion, configured to come into contact with the target object, may be changed depending on the shape of the target object.

The present invention provides a unit cell including the above-mentioned electrode or electrode assembly. In addition, the present invention provides a battery module or a battery pack including the unit cell. In addition, the present invention provides a device having the unit cell, the battery module, or the battery pack mounted therein.

In the present invention, one or more constructions that do not conflict with each other may be selected and combined from among the above constructions.

ADVANTAGEOUS EFFECTS

As is apparent from the above description, a pressing apparatus according to the present invention includes a contact portion having a shape changeable depending on the shape of a target object to be pressed, a pressing portion configured to apply uniform force to the contact portion, and a pressure adjustment portion configured to adjust the force applied from the pressing portion differently depending on the shape of the target object in order to change the shape of the contact portion, whereby it is possible to apply uniform pressing force to the target object irrespective of the shape of the target object.

In addition, the target object, to which uniform pressing force is applied irrespective of the shape of the target object, may be uniformly laminated while the uniform shape of the target object is maintained. As a result, all parts of the target object are uniformly laminated, whereby it is possible to obtain a target object, the uniform shape of which is maintained. Furthermore, defects of the target object at a specific part thereof are remarkably reduced.

In addition, it is not necessary to perform an additional process for uniform lamination, whereby it is possible to reduce time and cost incurred in the process, which is economical.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Figure 2:
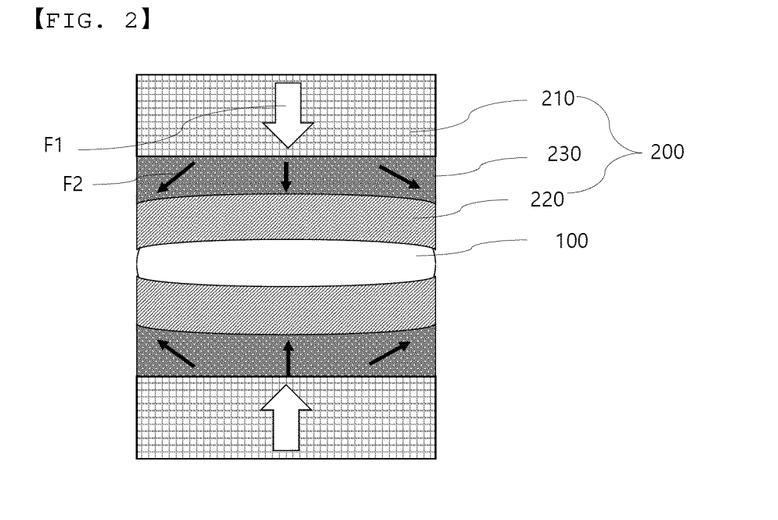
FIG. 2 is a schematic view of a pressing apparatus according to the present invention.
Figure 3:
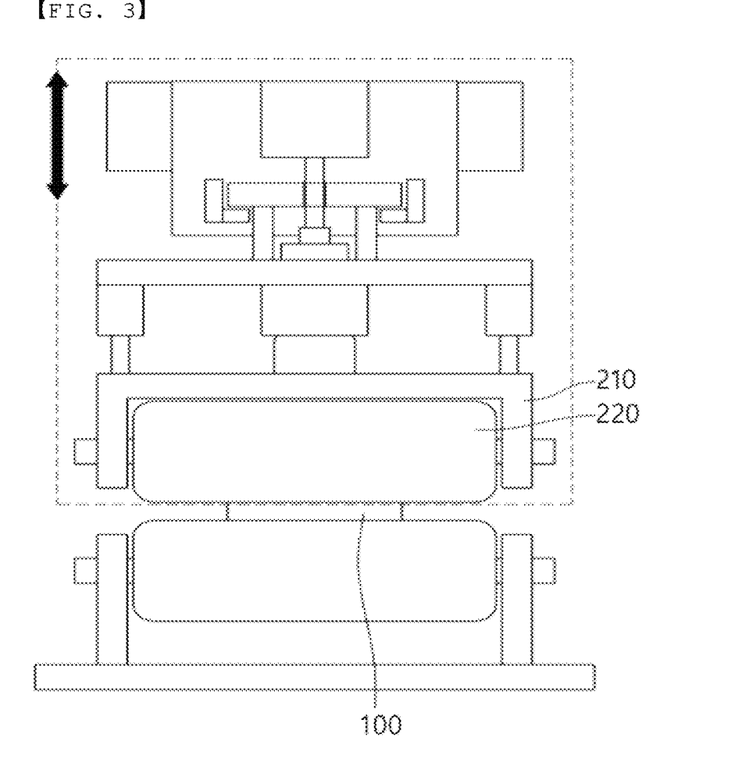
FIG. 3 is a schematic view of the pressing apparatus according to the present invention configured to have a pressing roll type structure.
Figure 4:
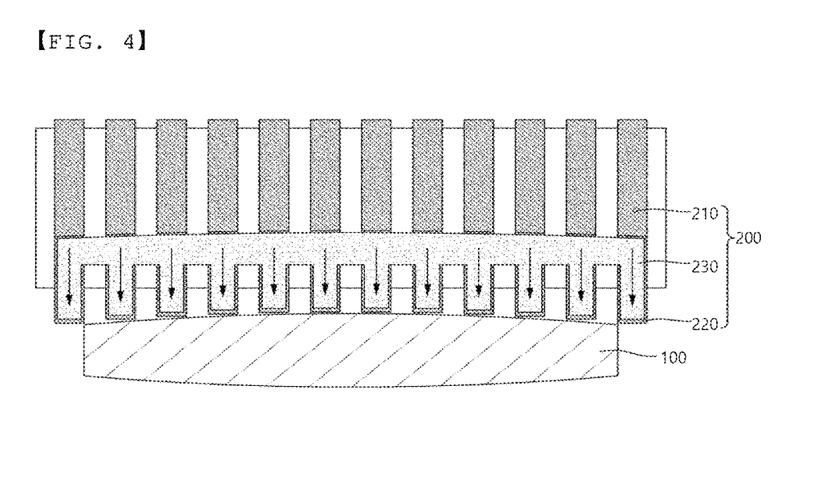
FIG. 4 is a schematic view showing the interior of a pressing apparatus according to a first embodiment of the present invention.
Figure 5:
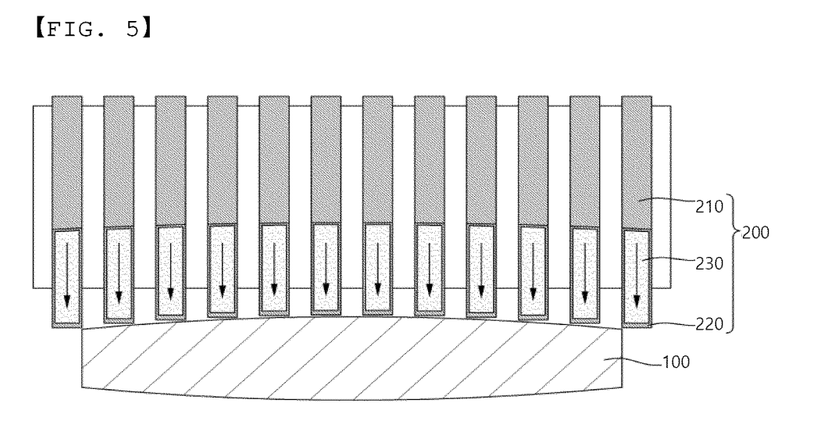
FIG. 5 is a schematic view showing the interior of a pressing apparatus according to a second embodiment of the present invention.

FIG. 2 is a schematic view of a pressing apparatus according to the present invention, FIG. 3 is a schematic view of the pressing apparatus according to the present invention configured to have a pressing roll type structure, FIG. 4 is a schematic view showing the interior of a pressing apparatus according to a first embodiment of the present invention, and FIG. 5 is a schematic view showing the interior of a pressing apparatus according to a second embodiment of the present invention.

The pressing apparatus 200 according to the present invention is characterized in that uniform pressure is applied to a target object 100 irrespective of the shape of the target object 100.

The target object 100 may be an electrode having an active material applied to one surface or opposite surfaces of an electrode current collector or an electrode assembly including electrodes, each of which is formed as described above, i.e. a positive electrode and a negative electrode, which are stacked in the state in which a separator is interposed therebetween.

The positive electrode includes a positive electrode active material layer applied to at least one surface of a positive electrode current collector. The positive electrode active material layer may be manufactured by applying a positive electrode mixture of a positive electrode active material, a conductive agent, and a binder. A filler may be further added to the positive electrode mixture as needed.

In general, the positive electrode current collector is manufactured so as to have a thickness of 3 μm to 500 μm. The positive electrode current collector is not particularly restricted as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, aluminum may be used. The positive electrode current collector may have a micro-scale uneven pattern formed on the surface thereof so as to increase the force of adhesion to the positive electrode active material layer. The positive electrode current collector may be configured in any of various forms, such as a film, a sheet, a foil, a net, a porous body, a foam body, or a non-woven fabric body.

The positive electrode active material may be constituted, for example, by a layered compound, such as a lithium nickel oxide ($LiNiO_2$), or a compound substituted with one or more transition metals; a lithium manganese oxide represented by the chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiV_3O_4$, $V_2O_5$, or $Cu_2V_2O_7$; an Ni-sited lithium nickel oxide represented by the chemical formula $LiNi_{1-x}M_xO_2$ (where M=Co, Mn, Al, Cu, Fe, Mg, B, or Ga, and x=0.01 to 0.3); a lithium manganese composite oxide represented by the chemical formula $LiMn_{2-x}M_xO_2$ (where M=Co, Ni, Fe, Cr, Zn, or Ta, and x=0.01 to 0.1) or the chemical formula $Li_2Mn_3MO_8$ (where M=Fe, Co, Ni, Cu, or Zn); $LiMn_2O_4$ in which a portion of Li in the chemical formula is replaced by alkaline earth metal ions; a disulfide compound; or $Fe_2(MoO_4)_3$. However, the present invention is not limited thereto.

The conductive agent is generally added so that the conductive agent accounts for 0.1 weight % to 30 weight % based on the total weight of the mixture including the positive electrode active material. The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; carbon fluoride powder; metallic powder, such as aluminum powder, or nickel powder; conductive whisker, such as a zinc oxide or potassium titanate; a conductive metal oxide, such as a titanium oxide; or a conductive material, such as a polyphenylene derivative, may be used as the conductive agent.

The binder, which is included in the positive electrode, is a component assisting in binding between the active material and the conductive agent and in binding with the current collector. The binder is generally added in an amount of 0.1 weight % to 30 weight % based on the total weight of the mixture including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer, sulfonated ethylene-propylene-diene monomer, styrene butadiene rubber, fluoro rubber, and various copolymers.

The negative electrode is manufactured by applying a negative electrode active material to one surface or opposite surfaces of a negative electrode current collector and drying the same, whereby a negative electrode active material layer is provided at one surface of the negative electrode. The above-described components may be selectively further included as needed.

Since the negative electrode is provided as a single-sided negative electrode having a negative electrode active material layer provided only at one surface of a negative electrode current collector, the space of a pouch-shaped secondary battery occupied by the negative electrode is reduced, whereby the capacity of the pouch-shaped secondary battery is increased.

As the negative electrode active material, for example, there may be used carbon, such as a non-graphitizing carbon or a graphite-based carbon; a metal composite oxide, such as $Li_xFe_2O_3$ ($0 \leq x \leq 1$), $Li_xWO_2$ ($0 \leq x \leq 1$), or $Sn_xMe_{1-x}Me'_yO_z$ (Me: Mn, Fe, Pb, Ge; Me': Al, B, P, Si, Group 1, 2 and 3 elements of the periodic table, halogen; $0 < x \leq 1$; $1 \leq y \leq 3$; $1 \leq z \leq 8$); lithium metal; lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Pb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The separator is interposed between the positive electrode and the negative electrode, and an insulative thin film that exhibits high ion permeability and mechanical strength is used as the separator. The separator generally has a pore diameter of 0.01 μm to 10 μm and a thickness of 5 μm to 300 μm. As the material for the separator, for example, a sheet or non-woven fabric made of an olefin-based polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator.

The electrode assembly may be a stacked type electrode assembly constituted by unit cells, each of which is configured to have a structure in which a rectangular positive electrode and a rectangular negative electrode are stacked in the state in which a separator is interposed therebetween, or a laminated/stacked type electrode assembly, which is configured to have a structure in which unit cells are stacked so as to be attached to each other in the state in which a separator is interposed between therebetween, but the present invention is not limited thereto. However, it is preferable for the electrode assembly not to be a jelly-roll type electrode assembly, which is configured to have a structure in which a long sheet type positive electrode and a long sheet type negative electrode are wound in the state in which a separator is interposed therebetween, or a stacked and folded type electrode assembly, which is configured to have a structure in which unit cells are wound using a long separation film, which reduces impregnability of an electrolyte solution.

The pressing apparatus according to the present invention presses the positive electrode, the negative electrode, or the electrode assembly in a stacking direction.

When describing the pressing apparatus 200 with reference to FIG. 2, the pressing apparatus 200 includes a pressing portion 210 configured to apply uniform force in the pressing apparatus, a contact portion 220 configured to come into direct contact with the target object 100, and a pressure adjustment portion 230 located between the pressing portion and the contact portion, the pressure adjustment portion having a fluid contained therein.

The pressing apparatus 200 is moved toward the target object 100 by the pressing portion 210, and the contact portion 220 of the pressing apparatus 200 may come into contact with the entirety of the outer surface of the target object 100.

Also, in the pressing roll type pressing apparatus shown in FIG. 32, the pressing portion 210 may not be connected to the pressure adjustment portion but may be connected to another region at which the pressure adjustment portion and the contact portion 220 can be pressed at once, as shown in FIG. 3.

As shown in FIG. 2, the pressing portion 210 may be configured to be in contact with the pressure adjustment portion 230. Alternatively, as shown in FIG. 3, the pressing portion may be configured to press a roll including a contact portion 220 and a pressure adjustment portion (not shown). The roll may be configured such that the contact portion is located at the outer surface of the roll and the pressure adjustment portion is disposed in the contact portion.

The pressing portion 210 may be configured to move the pressing apparatus 200 using physical mechanical force, or may be located in the pressing apparatus so as to move members constituting the pressing apparatus, such as the contact portion 220 and the pressure adjustment portion 230, using hydraulic pressure in order to perform pressing.

In general, the pressing portion 210 may apply a pressing force of 1 kg/mm to 100 kg/mm to the contact portion 220 so as to come into contact with the target object 100; however, the pressing force may be changed depending on the thickness of the target object 100, elastic force of the target object 100, and a purpose to be achieved by pressing.

The contact portion 220, which is configured to come into direct contact with the target object 100, may be deformed depending on the shape of the target object 100. For example, the contact portion 220 may be made of an elastic material. Even in the case in which the outer surface of the target object includes a curved or bent portion, therefore, the contact portion may be deformed so as to come into tight contact with the entirety of the outer surface of the target object.

As an example, as shown in FIG. 2, the shape of the contact portion 220 may be changed depending on the shape of the target object 100. As can be seen from FIG. 2, the shape of the contact portion 220 is changed so as to correspond to the shape of the target object 100 by force applied by the pressing portion 210. The pressure adjustment portion 230 has a fluid contained therein. Consequently, pressure applied by the pressing portion 210 is distributed depending on the shape of the target object 100, whereby the shape of the contact portion 220 is changed so as to correspond to the external shape of the target object 100. At this time, late pressing force F2 applied by the pressure adjustment portion 230 is generated as a result of early pressing force F1 applied by the pressing portion 210 being appropriately dispersed by the fluid contained in the pressure adjustment portion 230 depending on the shape of the target object 100, whereby the contact portion 220 presses the entire area of the target object 100.

As another example, as shown in FIGS. 4 and 5, the height of the contact portion 220 may be changed. That is, the shape of the pressure adjustment portion 230 having the fluid contained therein may be changed to adjust projection or depression of the contact portion.

Specifically, the pressing apparatus 200 according to the first embodiment shown in FIG. 4 may be configured to have a structure in which a single pressure adjustment portion 230 is connected to a plurality of contact portions 220. That is, the pressure adjustment portion 230 may be a single member connected to a contact portion 220 constituted by a plurality of protrusions, and a fluid may be contained in the pressure adjustment portion.

At this time, the fluid may be contained in the fluid layer pressure adjustment portion so as to account for a percentage of less than 90%, whereby the fluid may be moved by the pressing portion 210 and the contact portion 220.

At this time, the contact portion 220 may be operated in a manner in which the contact portion 220 projects out of the pressing apparatus 200 or is depressed into the pressing apparatus through one surface thereof as a result of the members constituting the pressing apparatus 200, i.e. the contact portion 220, the pressing portion 210, and the pressure adjustment portion 230, moving together, as shown in FIG. 4.

In the pressing apparatus 200 according to the second embodiment shown in FIG. 5, pressure adjustment portions 230 may be individually connected to contact portions 220. That is, the pressure adjustment portions 230 may be individually connected to the contact portions 220, which form a pattern, in order to adjust the shape or position of the contact portions 220.

At this time, pressing portions 210 may be connected to the pressure adjustment portions 230 individually, i.e. one to one, as shown in FIG. 5, or a plurality of pressing portions 210 may be integrally connected to a single pressure adjustment portion 230, as shown in FIG. 4.

In the case in which the pressure adjustment portions 230 are individually connected to the contact portions 220, a movement range or a deformation range of each of the contact portions 220 may be further increased.

The contact portion 220 may be formed separately from the pressure adjustment portion 230, or the contact portion 220 and the pressure adjustment portion 230 may be integrated.

As shown in FIG. 5, the contact portion 220 is constituted by a plurality of protrusions configured to be individually movable, whereby movement ranges of the protrusions may be different from each other depending on the shape of the target object 100.

At this time, the contact portion 220 may be configured to have a pattern in which the heights of the protrusions are different from each other depending on the shape of the target object 100.

Figure 6:
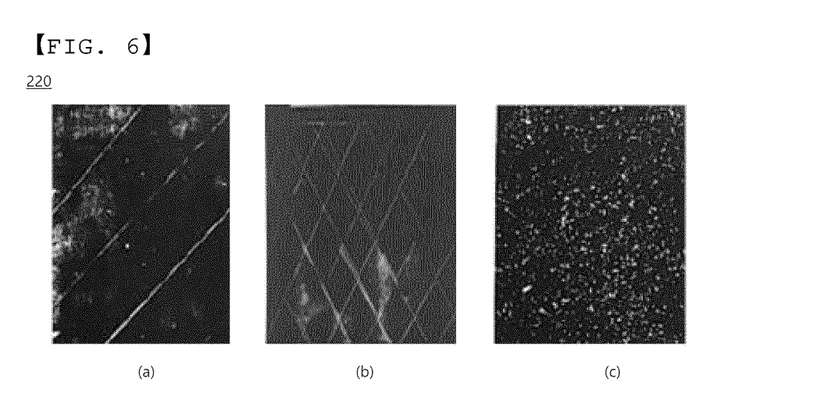
FIG. 6 is a photograph showing the shape of a pattern of a contact portion according to the present invention.

FIG. 6 is a photograph showing the shape of the pattern of the contact portion according to the present invention.

As can be seen from FIG. 6, the contact portion 220 according to the present invention may have an oblique pattern (a), an X-shaped pattern (b), or a dot type pattern (c) having a plurality of micro-scale protrusions.

The oblique pattern may be used in the case in which the shape of the target object 100 is the same oblique shape as the pattern of the contact portion 220 while having a uniform height or in the case in which the target object has the same shape as the pattern of the contact portion based on a specific reference line.

In addition, the X-shaped pattern (b) may be used in the case in which a target object 100 having a changed height while having a uniform pattern is pressed, and the dot type pattern (c) may be used in the case in which an amorphous target object 100 is pressed.

The interval or the size of the pattern may be changed depending on the shape of the target object 100. In general, however, it is preferable for the interval of the pattern to be 1 mm to 100 mm. In the case in which the interval of the pattern is less than the above range, it may be difficult to perform a fine adjustment or form a contact portion 220 having a pattern by a fluid. In the case in which the interval of the pattern is greater than the above range, it may be difficult to achieve uniformity in lamination through uniform pressing force, which must be achieved in the present invention.

The contact portion 220 may simultaneously perform heating while performing pressing. As a result, it is possible to easily achieve lamination for increasing coupling force of the positive electrode, the negative electrode, or the electrode assembly.

The pressing apparatus according to the first embodiment may be configured to have a structure in which a single pressure adjustment portion 230 is connected to a plurality of contact portions 220, as shown in FIG. 4. That is, the pressure adjustment portion 230 may be constituted by a single fluid layer connected to a contact portion 220 constituted by a plurality of protrusions.

At this time, a fluid may be contained in the fluid layer so as to account for a percentage of less than 90%, whereby the fluid may be moved by the pressing portion 210 and the contact portion 220.

In the pressing apparatus according to the second embodiment, pressure adjustment portions 230 may be individually connected to contact portions 220, as shown in FIG. 5. That is, the pressure adjustment portions 230 may be individually connected to the contact portions 220, which form a pattern, in order to adjust the shape or position of the contact portions 220.

At this time, pressing portions 210 may be individually connected to the pressure adjustment portions 230 or may be integrally connected to the pressure adjustment portions 230.

In the case in which the pressure adjustment portions 230 are individually connected to the contact portions 220, a movement range or a deformation range of each of the contact portions 220 may be further increased.

Also, in the pressing roll type pressing apparatus shown in FIG. 3, the pressing portion 210 may not be connected to the pressure adjustment portion 230.

The contact portion 220 may be formed separately from the pressure adjustment portion 230, or the contact portion 220 and the pressure adjustment portion 230 may be integrated.

Although the pressing apparatus 200 according to the present invention may press the target object 100 only in one direction depending on the shape of the target object 100, the pressing apparatus 200 may be constituted by an upper roll and a lower roll, each of which includes the pressing portion 210, the contact portion 220, and the pressure adjustment portion 230, in order to press a three-dimensional target object 100.

An electrode and electrode assembly manufacturing method according to the present invention includes a step (S1) of preparing an electrode or an electrode assembly as a target object to be pressed, a step (S2) of disposing the target object in the pressing apparatus described above, and a step (S3) of pressing the target object using the pressing apparatus.

The pressing apparatus may press one surface or opposite surfaces of the target object. At this time, the direction in which the pressing apparatus presses the target object may be changed depending on the shape of the target object.

In order to uniformly press the target object while maintaining the shape of the target object, the pressing apparatus may be deformed depending on the shape of the target object, or pressing force applied to the contact portion that comes into contact with the target object may be changed depending on the shape of the target object. Since the pressing apparatus has a shape changed depending on the shape of the target object, as described above, it is possible to apply uniform pressure to the target object. As a result, the target object may be uniformly laminated, whereby a defect rate of the target object may be reduced and various shapes of target objects may be formed.

The present invention provides a unit cell including the above-mentioned electrode or electrode assembly. In addition, the present invention provides a battery module or a battery pack including the unit cell. In addition, the present invention provides a device having the unit cell, the battery module, or the battery pack mounted therein.

The device may be an electronic device including a large-capacity battery, such as an electric vehicle, a hybrid electric vehicle, or a plug-in hybrid electric vehicle.

Those skilled in the art to which the present invention pertains will appreciate that various applications and modifications are possible within the category of the present invention based on the above description.

DESCRIPTION OF REFERENCE SYMBOLS 10, 100: Target objects
20, 200: Pressing apparatuses
210: Pressing portion
220: Contact portion
230: Pressure adjustment portion
F1: Early pressing force
F2: Late pressing force

INDUSTRIAL APPLICABILITY

As is apparent from the above description, a pressing apparatus according to the present invention includes a contact portion having a shape changeable depending on the shape of a target object to be pressed, a pressing portion configured to apply uniform force to the contact portion, and a pressure adjustment portion configured to adjust the force applied from the pressing portion differently depending on the shape of the target object in order to change the shape of the contact portion, whereby it is possible to apply uniform pressing force to the target object irrespective of the shape of the target object.

In addition, the target object, to which uniform pressing force is applied irrespective of the shape of the target object, may be uniformly laminated while the uniform shape of the target object is maintained. As a result, all parts of the target object are uniformly laminated, whereby it is possible to obtain a target object, the uniform shape of which is maintained. Furthermore, defects of the target object at a specific part thereof are remarkably reduced.

The invention claimed is:

1. A pressing apparatus comprising:
    a contact portion having a shape or position configured to be changed depending on a shape of a target object to be pressed;
    a pressing portion configured to apply uniform force to the contact portion; and
    a pressure adjustment portion located between the contact portion and the pressing portion, the pressure adjustment portion having a fluid contained therein,
    wherein the contact portion has a plurality of protrusions configured to be individually movable relative to the pressing portion,
    wherein the pressure adjustment portion has a plurality of pressure adjustment parts individually connected to corresponding ones of the plurality of protrusions of the contact portion, and
    wherein the pressing portion has a plurality of pressing parts individually connected to corresponding ones of the plurality of pressure adjustment parts.

2. The pressing apparatus according to claim 1, wherein the contact portion has a contact pattern configured to change a pressure applied to the target object depending on the shape of the target object.

3. The pressing apparatus according to claim 2, wherein the contact pattern is an oblique pattern, an X-shaped pattern, or a dot type pattern having a plurality of micro-scale protrusions.

4. The pressing apparatus according to claim 1, wherein the fluid of the pressure adjustment portion is connected to the plurality of protrusions.

5. The pressing apparatus according to claim 1, wherein the fluid of the pressure adjustment portion occupies less than 90% of the pressure adjustment portion.

6. The pressing apparatus according to claim 1, wherein the pressing apparatus comprises:
   an upper roll comprising the contact portion, the pressing portion, and the pressure adjustment portion; and
   a lower roll having an identical construction as the upper roll.

7. The pressing apparatus according to claim 1, wherein the contact portion has a contact pattern configured to simultaneously contact an entirety of a confronting surface of the target object during a beginning of a pressing of the target object.

8. An electrode and electrode assembly manufacturing method comprising:
   providing a pressing apparatus comprising a contact portion having a shape or position configured to be changed depending on a shape of a target object to be pressed, a pressing portion configured to apply uniform force to the contact portion, and a pressure adjustment portion located between the contact portion and the pressing portion, the pressure adjustment portion having a fluid contained therein, the contact portion having a plurality of protrusions configured to be individually movable relative to the pressing portion, the pressure adjustment portion having a plurality of pressure adjustment parts individually connected to corresponding ones of the plurality of protrusions of the contact portion, and the pressing portion having a plurality of pressing parts individually connected to corresponding ones of the plurality of pressure adjustment parts;
   preparing an electrode or an electrode assembly that is the target object to be pressed;
   disposing the target object in the pressing apparatus; and
   pressing the target object using the pressing apparatus.

9. The electrode and electrode assembly manufacturing method according to claim 8, wherein, during the pressing of the target object, the shape of the contact portion or a pressing force applied to the contact portion is changed depending on the shape of the target object.

10. The electrode and electrode assembly manufacturing method according to claim 8, wherein, during a beginning of the pressing of the target object, the contact portion simultaneously contacts an entirety of a confronting surface of the target object.

* * * * *